United States Patent [19]

Aldred et al.

[11] Patent Number: 4,591,615

[45] Date of Patent: May 27, 1986

[54] THERMOPLASTIC ELASTOMER COMPOSITION

[75] Inventors: Alan C. G. Aldred, North Cheam; Sidney G. Fogg, Ashtead, both of England

[73] Assignee: The British Petroleum Company p.l.c., London, England

[21] Appl. No.: 703,433

[22] Filed: Feb. 20, 1985

[30] Foreign Application Priority Data

Feb. 28, 1984 [GB] United Kingdom ............... 8405190

[51] Int. Cl.⁴ .................... C08L 77/00; C08L 23/26; C08L 9/02
[52] U.S. Cl. .................... 525/179; 525/193; 525/194; 525/196; 525/230
[58] Field of Search .......... 525/194, 230, 179

[56] References Cited

U.S. PATENT DOCUMENTS

| | | | |
|---|---|---|---|
| 3,037,954 | 6/1962 | Gessler et al. | 524/525 |
| 3,758,643 | 9/1973 | Fischer | 525/194 |
| 3,873,494 | 3/1975 | Lewis | 525/230 |
| 4,340,684 | 7/1982 | Bohm | 525/194 |

FOREIGN PATENT DOCUMENTS

| | | |
|---|---|---|
| 1468603 | 3/1977 | United Kingdom . |
| 2028837 | 12/1982 | United Kingdom . |

*Primary Examiner*—Carman J. Seccuro
*Attorney, Agent, or Firm*—Morgan, Finnegan, Pine, Foley & Lee

[57] ABSTRACT

A process for producing a thermoplastic elastomer comprising curing a blend of nitrile rubber and a thermoplastic under dynamic curing conditions. The thermoplastic comprises a copolymer of ethylene and an acrylic or methacrylic ester, e.g. ethylene-ethyl acrylate, and the curing agent is a peroxy curing agent. The compositions are cured by mixing at a temperature above the activation temperature of the curing agent and above the melting point of the thermoplastic copolymer.

9 Claims, No Drawings

THERMOPLASTIC ELASTOMER COMPOSITION

The present invention relates to a process for producing a thermoplastic elastomer composition and to the composition produced by the process.

Thermoplastic elastomers i.e. elastomeric materials which are capable of being fabricated, including being reprocessed, by techniques conventionally associated with thermoplastic materials are known. For example, U.S. Pat. No. 3,037,954 discloses a process for preparing a thermoplastic vulcanised blend of crystalline polypropylene and rubbery polymers, particularly chlorinated rubbers but also including butadiene acrylonitrile rubbers. The process, which is known as "dynamic curing" comprises mixing together the polypropylene and the vulcanised rubber with a curing agent, which is not a peroxide catalyst, and curing the mixture at a temperature of 225° to 350° F. (107° to 177° C.) while thoroughly mixing the composition.

Thermoplastic elastomeric compounds prepared by dynamically curing blends of EPDM rubber and polypropylene and blends of nitrile rubber and nylon are disclosed in two papers by A. Y. Coran and R. Patel published in Rubber Chemistry and Technology Vol. 53 (1980) "Rubber-Thermoplastic Compositions. Part I. EPDM-Polypropylene Thermoplastic Vulcanisates" pages 141 to 150 and "Rubber-Thermoplastic Compositions. Part II. NBR-Nylon Thermoplastic Elastomeric Compositions" pages 781 to 794.

The known thermoplastic elastomers comprise domains of cross-linked rubber dispersed in a thermoplastic. There is apparently no reaction between the thermoplastic and the rubber or curing agent.

It has now been found that thermoplastic elastomers may be prepared from nitrile rubber and a copolymer of ethylene and an acrylic or methacrylic ester using a peroxy curing agent. Both the rubber and the thermoplastic are cross-linkable by the peroxy curing agent.

Blends of nitrile rubber and ethylene acrylate or methacrylate copolymers are known, but only as conventionally curable elastomeric compositions. For example British Patent No. 1468603 discloses a curable composition comprising a homogeneous blend of a butadiene/acrylonitrile polymer and an ethylene alkyl (meth) acrylate copolymer. These compositions may be cured to form an oil resistant, ageing-resistant elastomer using a peroxide curing system. The compositions have good heat resistance at high temperatures.

According to the present invention a process for producing a thermoplastic elastomer comprises curing a blend of nitrile rubber and a thermoplastic under dynamic curing conditions characterised in that the blend comprises (A) a nitrile rubber, (B) a copolymer comprising ethylene and an acrylic or methacrylic ester and (C) a peroxy curing agent and is cured by mixing at a temperature above the activation temperature of the peroxy curing agent and above the melting temperature of the ethylene-(meth)acrylate copolymer.

Nitrile rubbers are known copolymers of a diene and an unsaturated nitrile for example isoprene/acrylonitrile copolymer and butadiene/acrylonitrile. In the present invention a preferred nitrile rubber is butadiene/acrylonitrile copolymer. Preferably the nitrile rubber, e.g. a butadiene/acrylonitrile copolymer, has an acrylonitrile content of from 20 to 45% by weight.

Copolymers of ethylene and an acrylic or methacrylic ester are known and some are commercially available. They may be made by conventional and well known methods. The ester group of the acrylate or methacrylate comonomer is preferably an alkyl group and more preferably a $C_1$ to $C_4$ alkyl group. The ethylene/alkyl (meth)acrylate copolymer preferably contains from 75 to 95% by weight (based on copolymer) of ethylene. A preferred copolymer is an ethylene/ethyl acrylate copolymer.

Peroxy curing agents are known and suitable examples include dicumyl peroxide; 1,1-di-tertiary butyl-peroxy-3.3.5-trimethyl cyclohexane; di-tertiarybutyl peroxide; 2,5-dimethyl-2,5-bis(tertiary butyl peroxy) hexane; tertiarybutyl cumyl peroxide; bis(tertiarybutyl peroxy isopropyl)benzene; tertiary butyl peroxy benzoate and 4,4-ditertiary butyl peroxy n-butyl valerate. The peroxy curing agent may be supported on an inert carrier such as, for example precipitated calcium carbonate, silica or Kieselguhr.

The ratio of nitrile rubber to the copolymer of ethylene and acrylic or methacrylic ester is preferably from 1:4 to 4:1 parts by weight. The amount of peroxy curing agent is preferably from 0.3 to 4% by weight based on the total weight of the nitrile rubber and copolymer of ethylene and acrylic or methacrylic ester.

The thermoplastic elastomer compositions prepared according to the process of the present invention may also contain additives such as, for example, antioxidants, fillers, pigments, softeners, process aids etc. Reactive monomers, generally known as "co-agents", which are conventionally used in rubber formulations, may also be included in compositions prepared according to the process of the present invention. An example of a suitable co-agent is 1,3-butylene glycol dimethacrylate. The amount of co-agent preferably does not exceed 20 parts by weight per 100 parts of the combined weight of the nitrile rubber and copolymer of ethylene and acrylic or methacrylic ester.

The high temperature properties of a composition prepared according to the process of the present invention may be improved by the inclusion in the composition of a further thermoplastic polymer, for example, polyethylene (low, medium or high density), linear low density polyethylene, polypropylene or a polyamide. The amount of these polymers is preferably not more than 40 parts by weight per 100 parts of the combined weight of the nitrile rubber and the copolymer of ethylene and acrylic or methacrylic ester.

The components may be mixed and cured in conventional rubber mixing equipment. The temperature may be maintained below the activation temperature of the peroxy curing agent but preferably above the melting point of the copolymer of ethylene and acrylic or methacrylic ester until the components have been blended together. The temperature is then increased to a temperature above the activation temperature of the curing agent. The blend is continuously mixed during the curing of the rubber-copolymer blend.

The curing temperature selected depends inter alia on the curing agent and the copolymer used. Preferably the curing temperature is from 130° to 250° C. and the blend is mixed at this elevated temperature for a period of from 5 to 30 minutes.

Preferably the compositions prepared according to the process of the present invention have a melt index as determined by test method ASTM D-1238-70 of from 0.5 to 15 at 190° C.

The invention is illustrated by the following examples.

EXAMPLES 1 to 3

Three thermoplastic elastomer compositions were prepared comprising nitrile rubber and ethylene-ethyl acrylate copolymer cured with dicumyl peroxide. The compositions also contained stearic acid as a process aid. The proportions of the compositions are given in Table 1 in parts by weight.

TABLE 1

| Example | 1 | 2 | 3 |
|---|---|---|---|
| Component |  |  |  |
| Nitrile Rubber | 50 | 40 | 60 |
| Ethylene-ethyl acrylate | 50 | 60 | 40 |
| Dicumyl peroxide curing agent | 2.2 | 2.2 | 2.2 |
| Stearic Acid | 1 | 1 | 1 |

The nitrile rubber was an acrylonitrile-butadiene copolymer rubber sold by BP Chemicals Limited under the trade name Breon N36C35. The rubber had a Mooney viscosity ML 1+4 at 100° C. of 35 and contained 36% by weight of bound acrylonitrile. The specific gravity of the rubber was 0.98.

The ethylene-ethyl acrylate copolymer was supplied by BP Chemicals under the designation DFDM-6170. The copolymer had a melt index of 6 g/10 min (determined by standard test method ISO R 292), a density of 0.942 g/cm$^3$ (determined by standard test method ISO R 1183) an ethyl acrylate content of 18% by weight and a Vicat softening point of 64° C. (determined by test method ISO R 306).

The peroxy curing agent was a commercially available curing agent sold by Hercules under the trade name Di-Cup 40C comprising approximately 40% by weight of dicumyl peroxide supported on precipitated calcium carbonate.

The nitrile rubber was charged into a Brabender mixer and mixed at a rotor speed of 60 rpm for approximately one minute. The ethylene-ethyl acrylate copolymer, dicumyl peroxide and stearic acid were then added to the mixer and the rotor speed was increased to 120 rpm. After 5 minutes mixing the torque reading on the mixer was 660 meter grams and beginning to increase, indicating that cross-linking of the dispersed particles of the nitrile rubber was taking place. The torque continued to increase for approximately 2 minutes reaching a maximum of 900 meter grams. After a further 2 minutes mixing the torque again began to rise indicating that the ethylene-ethyl acrylate copolymer was cross-linking. The torque continued to increase for approximately 6 minutes reaching a maximum of 2100 meter grams. During the mixing the temperature rose to approximately 190° C. which temperature is above the activation temperature of dicumyl peroxide and above the melting temperature of the ethylene-ethyl acrylate copolymer.

The compound was removed from the mixer and milled at 130° C. on a two-roll mill. The sheet produced by milling the compound was allowed to cool to ambient temperature (circa 20° C.) and then cut into strips. These strips were then reprocessed by mixing in the Brabender mixer for 10 minutes and then passed through the two-roll mill at 130° C. 20 g of the sheet produced by milling were moulded for 5 minutes in a 150×150 mm press at 180° C. and 20 tonne pressure. The mould was cooled to 60° C. and then the moulded sheet removed. The physical properties of this reprocessed composition were measured and the results for each of the three compounds are given in Table 2. The tensile strength, elongation at break and modulus for each composition were determined according to British Standard 903 Part A2.

For comparison a sheet was prepared as for Composition 1 except that the dicumyl peroxide was omitted. The physical properties of this comparative composition are also included in Table 2.

TABLE 2

| Composition | 1 | 2 | 3 | Comparative Composition |
|---|---|---|---|---|
| Tensile strength (MPa) | 13 | 15.1 | 14.9 | 4.4 |
| Elongation at break (%) | 428 | 439 | 424 | 678 |
| Modulus 100% (MPa) | 3.4 | 3.9 | 3.0 | 2.3 |
| Modulus 300% (MPa) | 7.5 | 8.4 | 7.7 | 2.9 |
| Shore A hardness - 5 second | 66 | 65 | 61 | 57 |

The results show that the three compositions prepared according to the method of the invention are thermoplastic elastomers and have, after reprocessing, higher tensile strengths, moduli and hardness than the blend containing no cross-linking agent.

EXAMPLES 4–7

Four thermoplastic elastomer compositions were prepared comprising nitrile rubber and ethylene-ethyl acrylate copolymer cured with dicumyl peroxide. The same acrylonitrile-butadiene copolymer rubber, ethylene-ethyl acrylate copolymer and dicumyl peroxide curing agent were used as in Example 1 and the only difference in the method of preparing the sheets of reprocessed composition was in the proportions of rubber and thermoplastic used. The proportions of components are given in Table 3 in parts by weight, along with the tensile strength and elongation at break determined according to British Standard 903 Part A2.

TABLE 3

| Example | 4 | 5 | 6 | 7 |
|---|---|---|---|---|
| Component (parts by weight) |  |  |  |  |
| Nitrile rubber | 80 | 70 | 30 | 20 |
| Ethylene-ethyl acrylate | 20 | 30 | 70 | 80 |
| Dicumyl peroxide curing agent | 2.2 | 2.2 | 2.2 | 2.2 |
| Stearic acid | 1 | 1 | 1 | 1 |
| Physical Properties |  |  |  |  |
| Tensile strength (MPa) | 12.3 | 12.6 | 15.8 | 15.9 |
| Elongation at break (%) | 384 | 407 | 465 | 496 |

EXAMPLE 8

Example 1 was repeated except that the 2.2 parts by weight of dicumyl peroxide curing agent were replaced with 4 parts by weight of a peroxy curing agent sold by Akzo Chemie under the trade name Trigonox 29-40B. The peroxy curing agent comprised 40% by weight of 1,1-di tert butyl peroxy-3.3.5-trimethylcyclohexane supported on silica.

Physical properties of the reprocessed sheet, determined according to British Standard 903 Part A2, were as follows;

Tensile strength: 14.7 MPa
Elongation at break: 440%
Modulus at 300%: 9.23 MPa

EXAMPLE 9

A thermoplastic elastomer composition was prepared comprising the following components in parts by weight;
  Nitrile rubber: 50
  Ethylene-ethylacrylate copolymer: 50
  Zinc oxide: 5
  Peroxy curing agent: 3

The nitrile rubber and ethylene-ethyl acrylate copolymer were the same as used in Example 1. The peroxy curing agent was a commercially available material sold by Akzo Chemie under the trade name Trigonox 17-40B and comprised 40% by weight of 4.4-di tert butyl peroxy n-butyl valerate supported on silica. The zinc oxide was included as a pigment and stabiliser.

The physical properties of the reprocessed composition, determined according to BS 903, were as follows;
  Tensile strength: 11.1 MPa
  Elongation at break: 349%
  Modulus at 300%: 5.0 MPa

EXAMPLES 10 to 12

Three thermoplastic elastomer compositions were prepared in the same manner as Example 1 using the components and proportions given in Table 4. The nitrile rubber and ethylene-ethyl acrylate copolymer were the same as used in Example 1 and the peroxy curing agent was trigonox 29-40B as used in Example 8. In Example 11, 10 parts by weight of the ethylene-ethyl acrylate copolymer were replaced by 10 parts by weight of linear low density polyethylene and in Example 12, 20 parts by weight of the ethylene-ethyl acrylate copolymer were replaced with high density polyethylene. The linear low density polyethylene had a specific gravity of 0.918 and a Vicat softening point of 100° C.

The tensile strength and elongation at break of each of the reprocessed compositions, as determined by BS 903 Part A2, are given in Table 4 along with the tensile strength of the compositions at 50° C. The results show that the compositions of Examples 11 and 12 which contains polyethylene have a greater tensile strength at 50° C. than the composition of Example 10.

TABLE 4

| Example | 10 | 11 | 12 |
| --- | --- | --- | --- |
| Components (parts by weight) | | | |
| Nitrile rubber | 60 | 60 | 60 |
| Ethylene-ethyl acrylate copolymer | 40 | 30 | 20 |
| Stearic acid | 1 | 1 | 1 |
| Peroxy curing agent | 3 | 3 | 2 |
| Low density polyethylene | — | 10 | — |
| High density polyethylene | — | — | 20 |
| Physical Properties | | | |
| Tensile strength (MPa) | 13.8 | 12.7 | 13.3 |
| Elongation at break (%) | 569 | 461 | 642 |
| Tensile strength at 50° C. (MPa) | 4.3 | 6.0 | 6.1 |

EXAMPLE 13

A one liter type BR Banbury mixer was preheated with steam to a temperature of 80° C. The ram pressure was set at 65 psi (448 kNm$^{-2}$). 665 g of the same nitrile rubber as used in Example 1 was charged into the Banbury mixer, the ram was lowered and the rotor speed set at 100 rpm. After mixing the rubber for one minute, 55.4 g of the same ethylene-ethyl acrylate copolymer as used in Example 1 was added to the mixer together with 11.1 g of stearic acid and 24.4 g of the same supported dicumyl peroxide curing agent as used in Example 1 (i.e. 9.76 g of dicumyl peroxide). After mixing for approximately 5 minutes, the torque began to rise indicating that cross-linking was occurring. The torque increase levelled out after 9 minutes and the mixture was dumped from the Banbury. The temperature of the dumped mixture, as determined using a needle pyrometer was 195° C.

The mixture was milled at 130° C. on a two roll mill. The sheets produced by milling the mixture were allowed to cool to ambient temperature (approximately 20° C.) and were then granulated. The granules were charged into a ZSK extruder and extruded as 2 mm diameter rods. These rods were water cooled and then pelletised. The pellets were used in a Stubbe SKM 51 injection moulding machine to mould dumbell-shaped test pieces suitable for use in British Standard 903 Part A2. The barrel temperature of the injection moulding machine was set at 200° C. at the feed zone and 230° C. at the nozzle zone. The mould temperature was set at 100° C. The tensile strength of the moulded final product was 9.7 MPa and the elongation at break was 410% as determined by BS 903 Part A2.

We claim:

1. A process for producing a thermoplastic elastomer comprising curing a blend of nitrile rubber and a thermoplastic under dynamic curing conditions characterized in that the blend comprises (A) a nitrile rubber, (B) a copolymer comprising ethylene and an acrylic or methacrylic ester and (C) a peroxy curing agent and in that both the rubber and the copolymer are cured by mixing at a temperature above the activation temperature of the peroxy curing agent and above the melting temperature of the ethylene(meth) acrylate copolymer.

2. A process as claimed in claim 1 in which the nitrile rubber is a copolymer of butadiene and acrylonitrile having an acrylonitrile content of from 20 to 45% by weight.

3. A process as claimed in claim 1 in which the copolymer comprises ethylene and $C_1$ to $C_4$ alkyl acrylate or methacrylate.

4. A process as claimed in claim 3 in which the copolymer comprises ethylene and ethyl acrylate.

5. A process as claimed in claim 1 in which the weight ratio of the nitrile rubber to the copolymer of ethylene and acrylic or methacrylic ester is from 1:4 to 4:1.

6. A process as claimed in claim 1 in which the composition also comprises a thermoplastic polymer selected from the group comprising polyethylene, polypropylene or a polyamide.

7. A process as claimed in claim 1 in which the curing temperature is from 130° to 250° C. and the blend is mixed at this temperature for a period of from 5 to 30 minutes.

8. A thermoplastic elastomer obtainable by a process as claimed in claim 1.

9. A thermoplastic elastomer as claimed in claim 8 having a melt index of from 0.5 to 15 at 190° C.

* * * * *